United States Patent
Suh et al.

(10) Patent No.: US 9,222,767 B2
(45) Date of Patent: Dec. 29, 2015

(54) DISPLAY APPARATUS AND METHOD FOR ESTIMATING DEPTH

(71) Applicant: SAMSUNG ELECTRONICS CO., LTD., Suwon-si, Gyeonggi-do (KR)

(72) Inventors: Sung Joo Suh, Seoul (KR); Kwon Ju Yi, Yongin-si (KR); Chang Kyu Choi, Seongnam-si (KR); Du Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 13/726,808

(22) Filed: Dec. 26, 2012

(65) Prior Publication Data

US 2013/0169643 A1 Jul. 4, 2013

(30) Foreign Application Priority Data

Jan. 3, 2012 (KR) .................. 10-2012-0000530
Aug. 8, 2012 (KR) .................. 10-2012-0086597

(51) Int. Cl.
*G06T 15/00* (2011.01)
*G01B 11/22* (2006.01)
*H04N 5/222* (2006.01)
*G06F 3/042* (2006.01)
*G06F 3/03* (2006.01)
*G01B 11/02* (2006.01)

(52) U.S. Cl.
CPC .............. *G01B 11/22* (2013.01); *G01B 11/026* (2013.01); *G06F 3/0325* (2013.01); *G06F 3/0425* (2013.01); *H04N 5/2226* (2013.01)

(58) Field of Classification Search
CPC .... G01B 11/026; G01B 11/22; H04N 5/2226; G06F 3/0325; G06F 3/0425
USPC .................. 345/419, 426, 428; 382/154; 348/333.01, 211.1, 211.99, 290, 345
See application file for complete search history.

(56) References Cited

U.S. PATENT DOCUMENTS

| | | | |
|---|---|---|---|
| 7,792,423 B2 * | 9/2010 | Raskar et al. | 396/268 |
| 8,073,268 B2 * | 12/2011 | Haskell | 382/232 |
| 8,290,358 B1 * | 10/2012 | Georgiev | 396/326 |
| 8,654,234 B2 * | 2/2014 | Hirsch et al. | 348/333.01 |

(Continued)

FOREIGN PATENT DOCUMENTS

| | | |
|---|---|---|
| JP | 2011-039844 | 2/2011 |
| KR | 10-2007-0021154 | 2/2007 |

(Continued)

OTHER PUBLICATIONS

Levin et al, Image and Depth from a Conventional camera with a Coded Aperture, ACM Trans. graph, Aug. 2007, pp. 1-9.*

(Continued)

*Primary Examiner* — Phu K Nguyen
(74) *Attorney, Agent, or Firm* — NSIP Law

(57) ABSTRACT

A display apparatus and method may be used to estimate a depth distance from an external object to a display panel of the display apparatus. The display apparatus may acquire a plurality of images by detecting lights that are input from an external object and passed through apertures formed in a display panel, may generate one or more refocused images, and may calculate a depth from the external object to the display panel using the plurality of images acquired and one or more refocused images.

25 Claims, 12 Drawing Sheets

(56) References Cited

U.S. PATENT DOCUMENTS

2008/0165267 A1* 7/2008 Cok .................... 348/333.01
2011/0019056 A1   1/2011 Hirsch et al.
2012/0007898 A1* 1/2012 Pavicic ..................... 345/690

FOREIGN PATENT DOCUMENTS

| KR | 10-2010-0075282 | 7/2010 |
| KR | 10-2010-0081803 | 7/2010 |
| KR | 10-2010-0088680 | 8/2010 |
| KR | 10-2011-0053734 | 5/2011 |
| KR | 10-2011-0054256 | 5/2011 |

OTHER PUBLICATIONS

Izadi et al., "Going Beyond the Display: A Surface Technology with an Electronically Switchable Diffuser," Proc. of the 21th annual ACM symposium on User interface software and technology, 2008, pp. 269-278.
Benko et al., "DepthTouch: Using Depth-Sensing Camera to Enable Freehand Interactions on and Above the Interactive Surface," Tech. Report MSR-TR-2009-23, Mar. 2009, 7 pages.
Hirsch et al., "BiDi Screen: A Thin, Depth-Sensing LCD for 3D Interaction using Light Fields," ACM Transactions on Graphics, 2009, vol. 28, No. 5, Article 159, 9 pages.
Lanman et al., "Shield Fields: Modeling and Capturing 3D Occluders," ACM Transactions on Graphics, 2008, vol. 27, No. 5, Article 131, 10 pages.
Veeraraghavan et al., "Dappled photography: Mask enhanced cameras for heterodyned light fields and coded aperture refocusing," ACM Transactions on Graphics, 2007, vol. 26, No. 3, Article 69, 12 pages.
Suh et al., "An LCD Display System with Depth-Sensing Capability Based on Coded Aperture Imaging," SID 2012 Digest, 2012, pp. 1574-1577.
Gottesman, "Coded apertures: past, present, and future applications and design," Proc. of SPIE, 2007, pp. 671405-1-671405-11.
Accorsi et al., "Near-field artifact reduction in planar coded aperture imaging," Applied Optics, 2001, vol. 40, No. 26, pp. 4697-4705.
Gottesman., "New family of binary arrays for coded aperture imaging," Appl. Opt., vol. 28, No. 20, 1989, pp. 4344-4352.
Fenimore et al., "Uniformly redundant arrays: digital reconstruction methods," Applied Optics, 1981. vol. 20, pp. 1858-1864.
Suh et al., "Efficient Synthetic Refocusing Method from Multiple Coded Aperture Images for 3D User Interaction", 2012, 8 pages.

* cited by examiner

FIG. 11

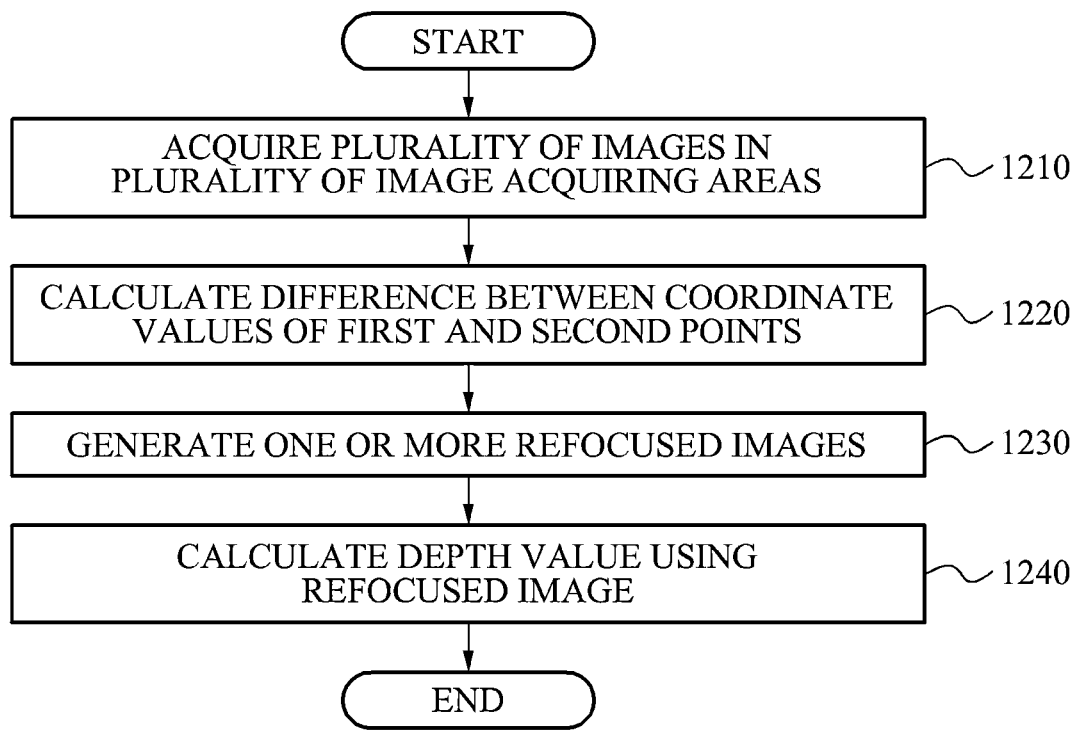

DISPLAY APPARATUS AND METHOD FOR ESTIMATING DEPTH

CROSS-REFERENCE TO RELATED APPLICATIONS

This application claims the priority benefit of Korean Patent Application No. 10-2012-0000530, filed on Jan. 3, 2012, and Korean Patent Application No. 10-2012-0086597, filed on Aug. 8, 2012, in the Korean Intellectual Property Office, the disclosures of which are incorporated herein by reference.

BACKGROUND

1. Field

Example embodiments disclosed herein relate to a display apparatus and method to estimate a depth from an external object to a display panel, and more particularly, to a display apparatus that may acquire a plurality of images by detecting lights input from an external object, and may estimate a depth from the external object using the plurality of images acquired.

2. Description of the Related Art

A display apparatus may provide intuitive interfaces by supporting touch sensing technology. With the development of three-dimensional (3D) imagery, a display apparatus may be provided with proximity sensing technology that may react by recognizing an approach to a 3D image, in conjunction with the touch sensing technology.

SUMMARY

The foregoing and/or other aspects are achieved by providing a display apparatus to estimate a depth, the apparatus including a display panel and a sensor panel to acquire a plurality of images by detecting lights that are input from an external object and pass through apertures formed on the display panel, and a processor to generate a refocused image based on a disparity that is set in association with a plurality of image acquiring areas on the sensor panel, and to calculate a depth from the external object to the display panel, using the refocused image.

Each of the plurality of image acquiring areas may maintain a constant correlation between a first point at which the image is captured, and a second point at which the image is captured in an adjacent image acquiring area.

The plurality of image acquiring areas may include a plurality of points, each having a coordinate value. The correlation may be maintained to be constant when a difference between a coordinate value of the first point and a coordinate value of the second point is identical in each of the plurality of image acquiring areas.

The disparity may be set to be a difference value between a reference point at which the image is captured in a reference area and the first point at which the image is captured in a remaining image acquiring area, among the plurality of image acquiring areas. The processor may generate m refocused images for each correlation, by shifting each image acquired in each of the plurality of image acquiring areas, based on the reference area in view of a corresponding disparity, and by averaging the plurality of images shifted. Here, m may be a natural number.

The processor may determine a refocused image in which the external object is in focus, among the m refocused images, and may calculate the depth using the determined refocused image.

When the refocused image in which the external object is in focus is determined, the processor may calculate the depth by dividing a resulting value, obtained by multiplying an aperture distance and a panel distance, by a resulting value, obtained by subtracting the aperture distance from a point distance. Here, the aperture distance may correspond to a distance between a first aperture and a second aperture adjacent to the first aperture formed in the display panel. The panel distance may correspond to a distance between the sensor panel and the display panel. The point distance may correspond to a distance between the first point at which the image is captured in a first image acquiring area corresponding to the first aperture and the second point at which the image is captured in a second image acquiring area corresponding to the second aperture.

The processor may determine a refocused image as having a relatively higher edge value or intensity value for the external object, among the m refocused images, and may calculate the depth using the determined refocused image.

The display panel may form the apertures in n imagining patterns, each including a plurality of pixels, and the sensor panel may acquire the plurality of images by detecting the input lights passing through the n imaging patterns. Here, n may be a natural number.

The display panel may include one or more opaque pixels and one or more transparent pixels. The display panel may form at least one of a circular hole pattern, a polygonal hole pattern, and a Modified Uniformly Redundant Array (MURA) pattern as an imaging pattern, by combining the one or more opaque pixels and the one or more transparent pixels.

The sensor panel may include a first pixel and a second pixel that are configured using separate single color filters each corresponding to different colors, respectively, or configured to include a plurality of color filters each corresponding to different colors, respectively. In this instance, the sensor panel may acquire an image corresponding to the colors of the plurality of color filters, by detecting the input light.

The apparatus may include a mode determining unit that determines whether to operate the display panel in a photograph mode or display mode, a backlight unit disposed on a lower portion of the sensor panel that radiates backlight to the display panel according to the determined mode, and a control unit that controls power to the backlight unit according to the determined mode.

The display apparatus may include a barrier panel that forms a pattern according to the determined mode, and the control unit controls power to the barrier panel according to the determined mode. When the mode is determined to be a photograph mode, the barrier panel may form apertures to transmit light input from the external object. When the mode is determined to be a display mode, the barrier panel may form a barrier pattern to visualize an image to be displayed on the display panel as a three-dimensional image.

The display panel may includes a plurality of organic light emitting diode (OLED) pixels to form an imaging pattern. The OLED pixels may include a light emitting unit that emits light using a light-emitting organic compound, a circuit unit that operates the light emitting unit, and a window to transmit or block light input from an external environment. The OLED pixels may include an infrared light source to output infrared light which is reflected by the external object back to the display panel, and a pass filter included in the display apparatus may extract infrared components of light input to the display panel, including infrared light reflected from the external object back to the display panel, and the sensor panel may generate image data for the external object by detecting the extracted infrared components.

The example embodiments may include a display apparatus that may obtain a plurality of images by detecting lights that are input from an external object and pass through apertures formed in a display panel, generate a refocused image based on a disparity that is set in association with a plurality of image acquiring areas in which images are acquired, and calculate a more accurate depth from the external object to the display panel, using the generated refocused image.

The example embodiments may include a display method to estimate a depth, the method including acquiring a plurality of images in a plurality of image acquiring areas by detecting lights emitted from an external object and transmitted through a plurality of apertures of a display panel, generating one or more refocused images based on a disparity set in association with the plurality of image acquiring areas, and calculating a depth from the external object to the display panel using at least one of the refocused images.

The example embodiments may also include a display apparatus that may reduce an amount of calculation incurred due to processing, for example, decoding. For example, the example embodiments disclose a single refocused image that is generated based on a plurality of images, which requires less processing than when compared to processing the plurality of images individually.

The example embodiments may also include a display apparatus that may generate a natural refocused image with respect to an external object, corresponding to colors of color filters, by applying the color filters to image processing.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIGS. 10A through 11 illustrate examples of colorizing a generated refocused image by applying color filters according to other example embodiments.

FIG. 12 illustrates a display method for estimating a depth according to example embodiments.

DETAILED DESCRIPTION

Figure 1:
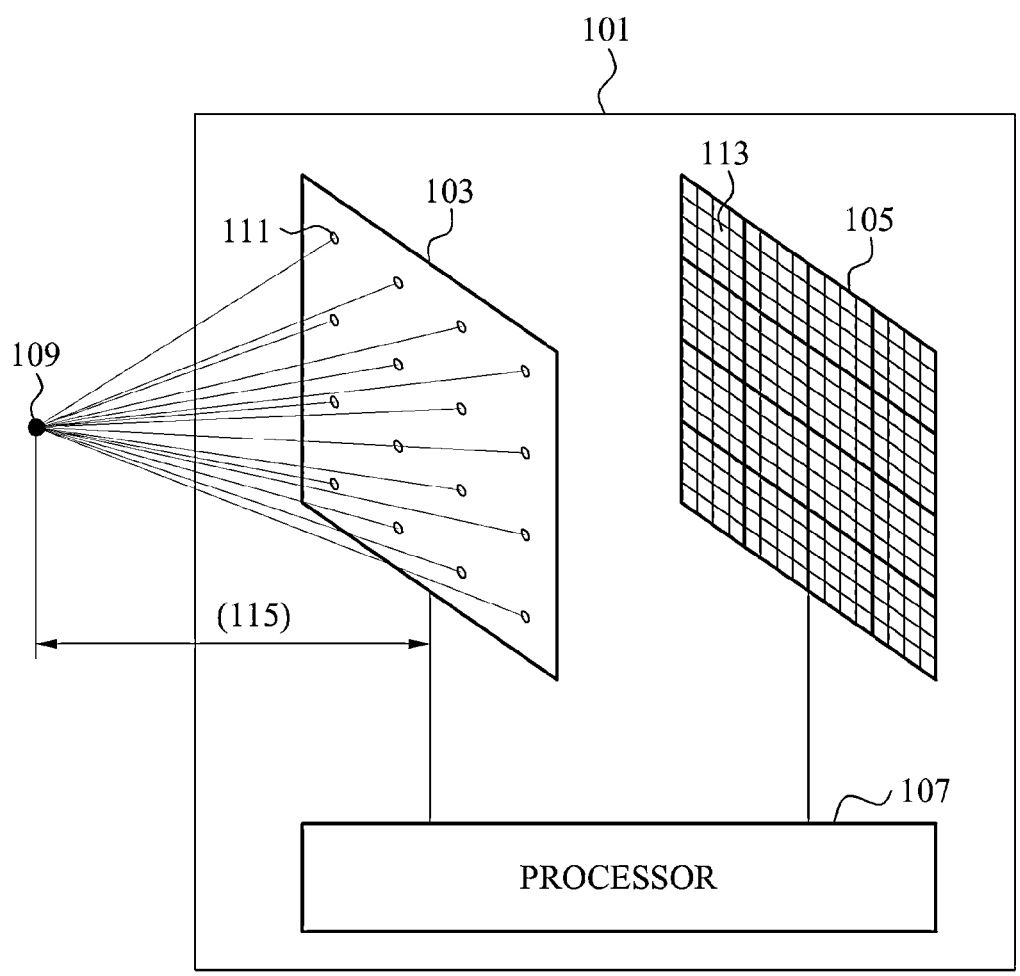
FIG. 1 illustrates a display apparatus for estimating a depth according to example embodiments.

Reference will now be made in detail to example embodiments, the examples of which are illustrated in the accompanying drawings, wherein like reference numerals refer to like elements throughout. Embodiments are described below to explain the present disclosure by referring to the figures.

FIG. 1 illustrates a display apparatus 101 for estimating a depth according to example embodiments.

Referring to FIG. 1, the display apparatus 101 may include a display panel 103, a sensor panel 105, and a processor 107.

The display panel 103 may include apertures 111 that may transmit lights input from an external object 109. That is, the display panel 103 may form the apertures 111 as n imaging patterns, each including a plurality of pixels. Here, n may be a natural number. In particular, the display panel 103 may include one or more opaque pixels and one or more transparent pixels. The display panel 103 may form at least one of a circular hole pattern, a polygonal hole pattern, and a Modified Uniformly Redundant Array (MURA) pattern as an imaging pattern, by combining the one or more opaque pixels and one or more transparent pixels.

The sensor panel 105 may acquire a plurality of images by detecting lights that are input from the external object 109 and pass through the apertures 111 formed in the display panel 103. That is, the sensor panel 105 may acquire the plurality of images by detecting input lights passing through the n imaging patterns. Here, the plurality of images may correspond to multiview images.

The sensor panel 105 may include pixels configured using color filters to acquire image data corresponding to colors of the color filters, by detecting the lights that are input from the external object 109 and pass through the display panel 103. In particular, the sensor panel 105 may include a first pixel and/or a second pixel. Here, the first pixel and the second pixel may be configured using separate single color filters each corresponding to different colors, respectively, or may be configured to include a plurality of color filters each corresponding to different colors, respectively.

For example, the sensor panel 150 may include a pixel configured using a color filter corresponding to red, a pixel configured using a color filter corresponding to blue, and a pixel configured using a color filter corresponding to green. Also, the sensor panel 105 may include a plurality of pixels configured using a color filter corresponding to red, a color filter corresponding to blue, and a color filter corresponding to green.

The sensor panel 105 may acquire n color images with respect to n input lights, respectively, using a red image, a blue image, and a green image that are acquired by each color filter.

Each of a plurality of image acquiring areas 113 on the sensor panel 105, in which images may be acquired, may maintain a constant correlation between a first point at which the image is captured, and a second point at which the image is captured in an adjacent image acquiring area. That is, the plurality of image acquiring areas 113 may include a plurality of points, each having a coordinate value. When a difference between a coordinate value of the first point and a coordinate value of the second point is identical in each of the plurality of image acquiring areas 113, the correlation may be maintained to be constant.

The sensor panel 105 may acquire a plurality of images for each correlation when a control unit (not shown) changes positions of the apertures 111 in the display panel 103.

The processor 107 may generate a refocused image based on a disparity that is set in association with the plurality of image acquiring areas 113 on the sensor panel 105, and may calculate a depth 115 from the external object 109 to the display panel 103, using the refocused image. Here, the disparity may be set to a difference value between a reference point at which the image is captured in a reference area and the first point at which the image is captured in a remaining image acquiring area, among the plurality of image acquiring areas 113.

In particular, the processor 107 may generate m refocused images for each correlation, by shifting each image acquired in each of the plurality of image acquiring areas 113, based on the reference area in view of a corresponding disparity, and averaging the plurality of images shifted. Here, m may be a natural number. For example, when m corresponds to 2, the processor 107 may generate a first refocused image using sixteen images that are acquired in sixteen image acquiring areas 113 on the sensor panel 105 based on a correlation of '−1 on a y axis', and may generate a second refocused image using sixteen images that are acquired in the sixteen image acquiring areas 113 on the sensor panel 105 based on a correlation of '−2 on a y axis'.

The processor 107 may determine a refocused image in which the external object 109 is in focus, among the m refocused images, and may calculate the depth using the determined refocused image. In this instance, the processor 107 may determine, among the m refocused images, a refocused image having a relatively high edge value or intensity value for the external object 109 to be the refocused image in which the external object is in focus.

When the refocused image in which the external object is in focus is determined, the processor 107 may calculate a depth Z from the external object 109 to the display panel 103 by dividing a resulting value, obtained by multiplying an aperture distance B and a panel distance F, by a resulting value, obtained by subtracting the aperture distance B from a point distance Δ. Here, the aperture distance B may correspond to a distance between a first aperture and a second aperture adjacent to the first aperture formed in the display panel 103. The panel distance F may correspond to a distance between the sensor panel 105 and the display panel 103. The point distance Δ may correspond to a distance between the first point at which the image is captured in a first image acquiring area corresponding to the first aperture and the second point at which the image is captured in a second image acquiring area corresponding to the second aperture. Here, the depth Z may be expressed by Equation 1.

$$Z = \frac{B \times F}{\Delta - B} \qquad \text{[Equation 1]}$$

Figure 2:
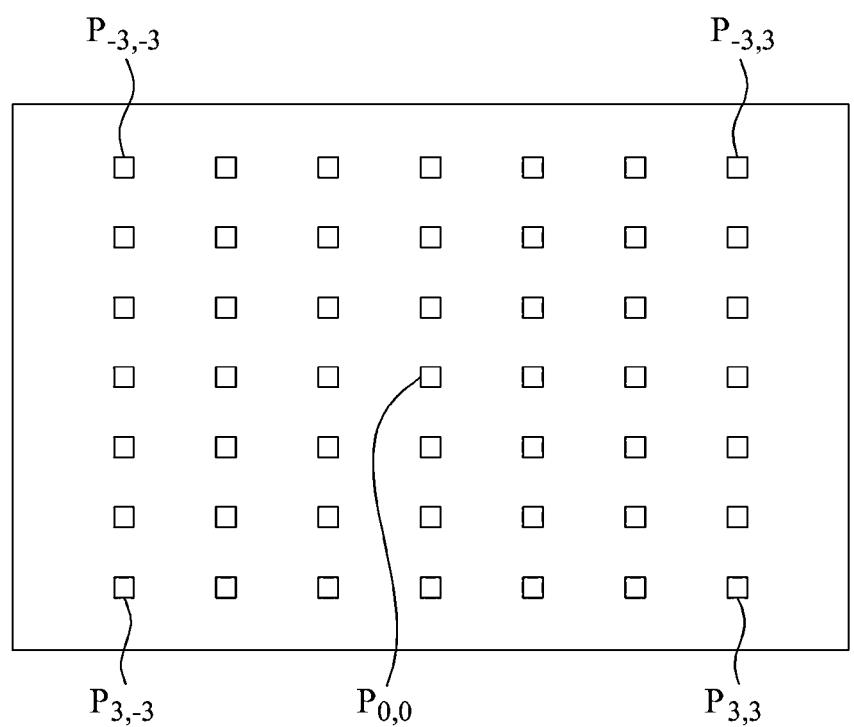
FIG. 2 illustrates a display panel to describe a refocused image generated in a display apparatus for estimating a depth according to example embodiments.

FIG. 2 illustrates a display panel to describe a refocused image generated in a display apparatus for estimating a depth according to example embodiments.

Referring to FIG. 2, the display apparatus may acquire a plurality of images by detecting lights that are input from an external object and pass through apertures in a display panel, using a sensor panel.

In this instance, the display apparatus may acquire, using the sensor panel, images $f_{x,y}$ by detecting input lights passing through apertures $P_{x,y}$ that are arranged around a central aperture $P_{0,0}$ in the display panel. Here, x indicates a row index, and y indicates a column index. The display apparatus may generate refocused images $f_s$ by shifting and averaging multiview images based on disparities for each depth from the external object to the display panel. Here, the refocused images $f_s$ may be expressed by Equation 2.

$$f_s(m, n) = \frac{1}{(X+X'+1)(Y+Y'+1)} \sum_{x=-X}^{X'} \sum_{y=-Y}^{Y'} f_{x,y}(m - \alpha x, n - \beta y), \qquad \text{[Equation 2]}$$

X denotes a number of images in a direction in which the row index decreases based on a central image $f_{0,0}$. X' denotes a number of images in a direction in which the row index increases based on the central image $f_{0,0}$. Y denotes a number of images in a direction in which the column index decreases based on the central image $f_{0,0}$. Y' denotes a number of images in a direction in which the column index increases based on the central image $f_{0,0}$. For example, all of X, X', Y, and Y' may correspond to 3.

Here, α denotes an extent to which an adjacent image $f_{1,0}$ or $f_{-1,0}$ may be shifted in a vertial direction, based on the central image $f_{0,0}$. β denotes an extent to which an adjacent image $f_{0,1}$ or $f_{0,-1}$ may be shifted in a horizontal direction, based on the central image $f_{0,0}$.

Also, although the display apparatus may generate the refocused images $f_s$ using all the images $f_{x,y}$ acquired by detecting the input lights, it is not limited thereto. The refocused images $f_s$ may be generated using a portion of the images $f_{x,y}$. In this instance, all of X, X', Y, and Y' in Equation 2 may correspond to a value of 1.

When the display panel includes MURA patterns at positions of the apertures $P_{x,y}$, the display panel may acquire images $h_{x,y}$ using the sensor panel. In this instance, the display apparatus may perform decoding $c^{-1}$ corresponding to the MURA patterns on the images $h_{x,y}$ acquired by detecting input lights passing through the MURA patterns, thereby converting the acquired images $h_{x,y}$ into the images $f_{x,y}$ acquired by detecting the input lights passing through the apertures, as expressed by Equation 3.

$$f_{x,y}(m,n) = h_{x,y}(m,n) \otimes c^{-1}(m,n). \qquad \text{[Equation 3]}$$

When the display panel includes the MURA patterns at the positions of the apertures $P_{x,y}$, the display apparatus may generate the refocused images $f_s$, as expressed by Equation 4.

$$\begin{aligned}
f_s(m, n) &= \frac{1}{(X+X'+1)(Y+Y'+1)} \sum_{x=-X}^{X'} \sum_{y=-Y}^{Y'} f_{xy}(m - \alpha x, n - \beta y) \\
&= \frac{1}{(X+X'+1)(Y+Y'+1)} \sum_{x=-X}^{X'} \sum_{y=-Y}^{Y'} h_{xy} \\
&\quad (m - \alpha x, n - \beta y) \otimes c^{-1}(m, n) \\
&= \left( \frac{1}{(X+X'+1)(Y+Y'+1)} \sum_{x=-X}^{X'} \sum_{y=-Y}^{Y'} h_{xy} \right. \\
&\quad (m - \alpha x, n - \beta y) \Big) \otimes c^{-1}(m, n) \\
&= \text{Fourier\_inverse}\{H_s(U, V) C^{-1}(U, V)\},
\end{aligned} \qquad \text{[Equation 4]}$$

$H_s$ denotes performing Fourier transform on an image generated by shifting and averaging the images acquired in association with each of the MURA patterns. $C^{-1}$ denotes Fourier transform of inverse MURA patterns $c^{-1}(m,n)$.

Since the display apparatus may perform Fourier transform with respect to only a size corresponding to a single multiview image by acquiring the refocused images $f_s$ using $H_s$ and $C^{-1}$, an amount of calculation may be reduced.

Figure 3:
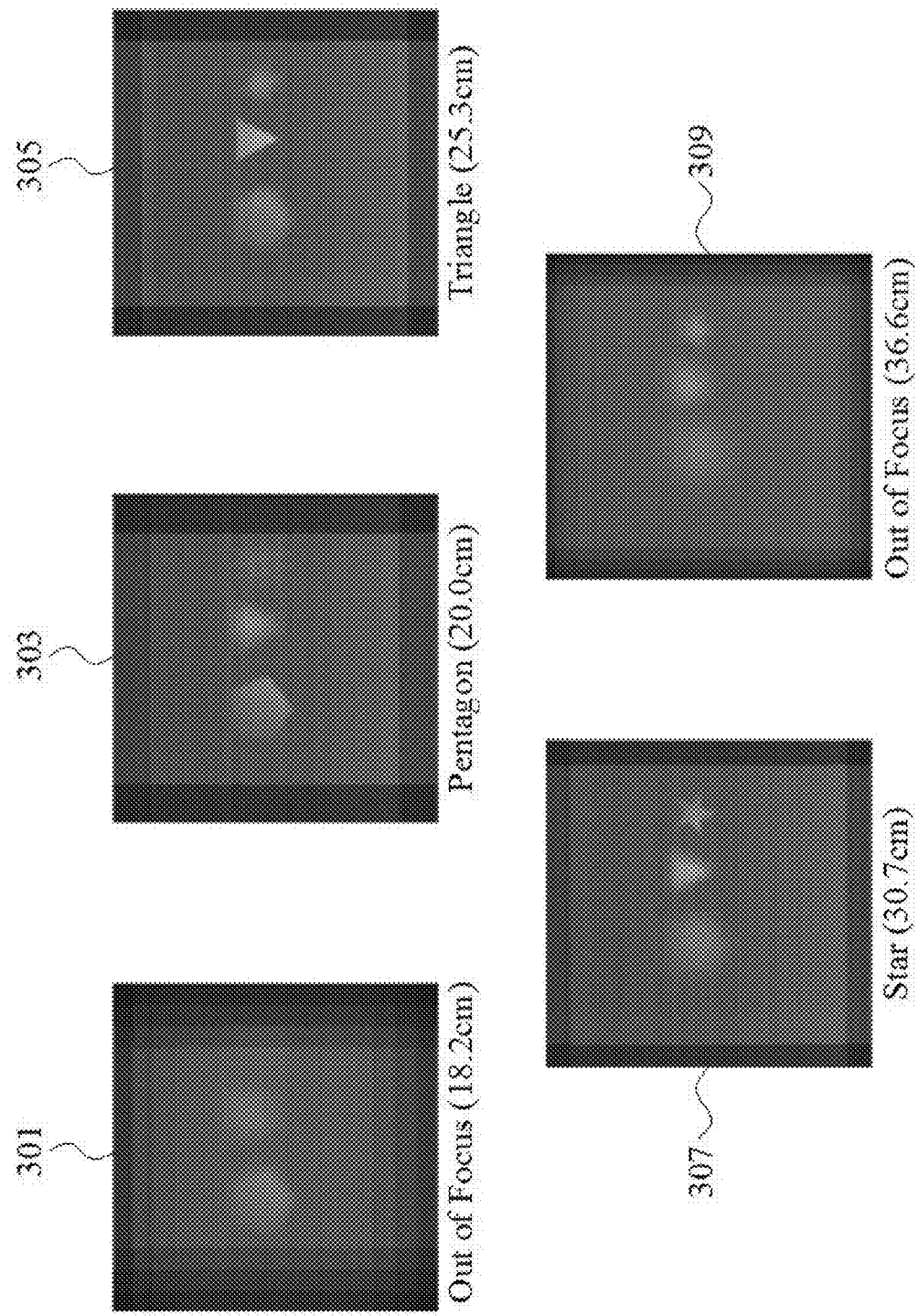
FIG. 3 illustrates refocused images generated in a display apparatus for estimating a depth according to example embodiments.

FIG. 3 illustrates refocused images generated in a display apparatus for estimating a depth according to example embodiments.

Referring to FIG. 3, when external objects correspond to, for example, a pentagon, a triangle, and a star, the display apparatus may acquire a plurality of refocused images for each disparity. That is, the display apparatus may acquire, as the plurality of images, refocused images 301 and 309 corresponding to depths of 18.2 centimeters (cm) and 36.6 cm, respectively, in which at least one of the pentagon, the triangle, and the star may be out of focus, a refocused image 303 corresponding to a depth of 20 cm, in which the pentagon may be in focus, a refocused image 305 corresponding to a depth of 25.3 cm, in which the triangle may be in focus, and a refocused image 307 corresponding to a depth of 30.7 cm, in which the star may be in focus.

Accordingly, the display apparatus may verify that a depth from the pentagon to the display apparatus is 20 cm, a depth from the triangle to the display apparatus is 25.3 cm, and a depth from the star to the display apparatus is 30.7 cm.

Figure 4:
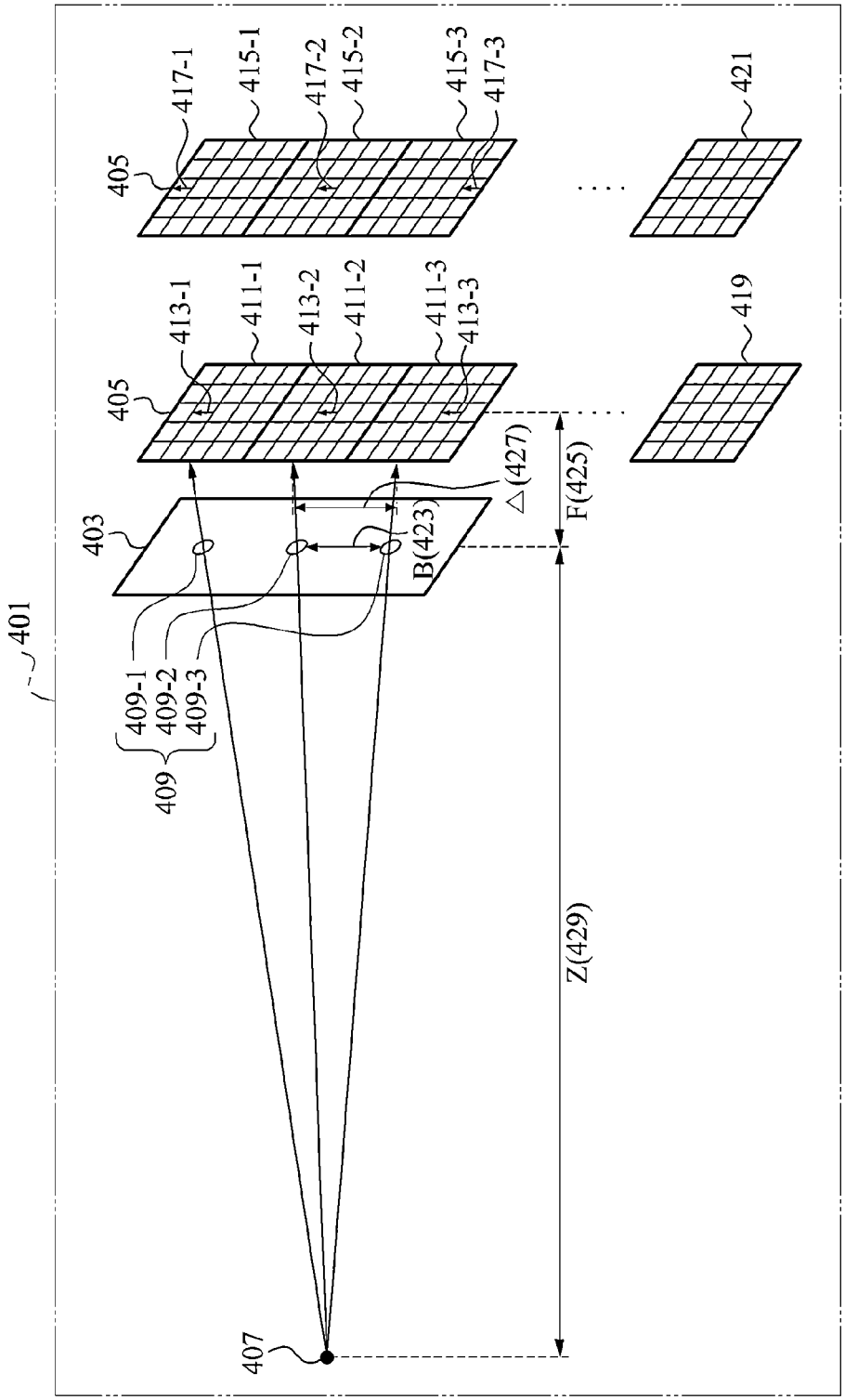
FIG. 4 illustrates a method of generating a refocused image and estimating a depth in a display apparatus for estimating a depth according to example embodiments.

FIG. 4 illustrates a method of generating a refocused image and estimating a depth in a display apparatus 401 for estimating a depth according to example embodiments.

Referring to FIG. 4, a plurality of images may be acquired by detecting lights that are input from an external object 407 and pass through apertures 409 (e.g. apertures 409-1, 409-2, and 409-3) in a display panel 403, using a sensor panel 405 in the display apparatus 401. For example, the display apparatus 401 may acquire three images by detecting lights that are input from the external object 407 and pass through the three apertures 409-1, 409-2, and 409-3, in the display panel 403.

In this instance, the display apparatus 401 may acquire a first image and a second image in which a correlation between a first point at which an image is acquired in a first image acquiring area on the sensor panel 405 and a second point at which an image is captured in a second image acquiring area on the sensor panel 405 may be maintained to be constant. Also, the display apparatus 401 may acquire a plurality of images, distinguished for each correlation, by controlling the size, shape, and/or location of apertures 409 in the display panel 403.

As an example, when a difference between a coordinate value of a first point and a coordinate value of a second point correspond to '−1 on a y axis,' the display apparatus 401 may acquire a first image 411-1, a second image 411-2, and a third image 411-3. That is, the display apparatus 401 may acquire the first image 411-1 in which coordinates of a first point 413-1 in a first image acquiring area are (0,1), and the second image 411-2 in which coordinates of a second point 413-2 in a second image acquiring area are (0,0), and the third image 411-3 in which coordinates of a third point 413-3 in a third image acquiring area are (0,−1).

As another example, when a difference between a coordinate value of a first point and a coordinate value of a second point correspond to '−2 on a y axis,' the display apparatus 401 may acquire a first image 415-1, a second image 415-2, and a third image 415-3. That is, the display apparatus 401 may acquire the first image 415-1 in which coordinates of a first point 417-1 in a first image acquiring area are (0,2), and the second image 415-2 in which coordinates of a second point 417-2 in a second image acquiring area are (0,0), and the third image 415-3 in which coordinates of a third point 417-3 in a third image acquiring area are (0,−2).

The display apparatus 401 may generate refocused images for each correlation, by shifting each image acquired in each of the image acquiring areas based on a reference area and in view of a corresponding disparity, and averaging the plurality of images shifted.

As an example, the display apparatus 401 may generate a first refocused image 419 with respect to the first image 411-1, the second image 411-2, and the third image 411-3 when the difference between the coordinate value of the first point and the coordinate value of the second point corresponds to '−1 on the y axis.' That is, when the second image acquiring area corresponds to the reference area, the display apparatus 401 may set '+1 on the y axis' as a disparity, and may shift the first image 411-1 by '−1 on the y axis' in view of the set disparity. Here, '+1 on the y axis' may correspond to a difference value between the second point 413-2 corresponding to a reference point at which an image is captured in the reference area, and the first point 413-1 corresponding to a point at which an image is captured in a remaining image acquiring area, that is, the first image acquiring area. Also, the display apparatus 401 may set '−1 on the y axis' as a disparity, and may shift the third image 411-3 by '+1 on the y axis' in view of the set disparity. Here, '−1 on the y axis' may correspond to a difference value between the second point 413-2 corresponding to a reference point at which an image is captured in the reference area, and the third point 413-3 corresponding to a point at which an image is captured in a remaining image acquiring area, that is, the third image acquiring area. The display apparatus 401 may generate the first refocused image 419 by averaging the first image 411-1 and the second image 411-2 that are shifted by '1' in a lower direction, and the third image 411-3 that is shifted by '1' in an upper direction.

As another example, the display apparatus 401 may generate a second refocused image 421 with respect to the first image 415-1, the second image 415-2, and the third image 415-3 when the difference between the coordinate value of the first point and the coordinate value of the second point corresponds to '−2 on the y axis.' That is, when the second image acquiring area corresponds to the reference area, the display apparatus 401 may set '+2 on the y axis' as a disparity, and may shift the first image 415-1 by '−2 on the y axis' in view of the set disparity. Here, '+2 on the y axis' may correspond to a difference value between the second point 417-2 corresponding to a reference point at which an image is captured in the reference area, and the first point 417-1 corresponding to a point at which an image is captured in a remaining image acquiring area, that is, the first image acquiring area. Also, the display apparatus 401 may set '−2 on the y axis' as a disparity, and may shift the third image 415-3 by '+2 on the y axis' in view of the set disparity. Here, '−2 on the y axis' may correspond to a difference value between the second point 417-2 corresponding to a reference point at which an image is captured in the reference area, and the third point 417-3 corresponding to a point at which an image is captured in a remaining image acquiring area, that is, the third image acquiring area. The display apparatus 401 may generate the second refocused image 421 by averaging the first image 415-1 and the second image 415-2 that are shifted by '2' in a lower direction, and the third image 415-3 that is shifted by '2' in an upper direction.

The display apparatus 401 may regenerate a color image, by colorizing the generated refocused image suitably for the external object 407.

In particular, the display apparatus 401 may include color filters corresponding to red (R), green (G), and blur (B), respectively. The display apparatus 401 may capture color components with respect to the external object 407 through the color filters. By decoding RGB coding images sequentially after the capturing is performed, the display apparatus 401 may process, that is regenerate, a color image with respect to the refocused image by combining color images.

For example, when a scene disposed on a front plane of a display correspond to S(x,y), the scene may be displayed using three basic colors of RGB. S(x,y) may be displayed, using Equation 5.

$$S(x,y) = S_R(x,y)\vec{r} + S_G(x,y)\vec{g} + S_B(x,y)\vec{b}$$  [Equation 5]

In Equation 5, $S_R(x,y)$, $S_G(x,y)$, and $S_B(x,y)$ denote tristimulus values each of the three primary colors red, green, and blue, respectively.

In order to obtain the tristimulus values from the scene disposed on the front plane of the display, a code image P(x,y) by an aperture A(x,y) may need to be acquired with respect to each of the three primary colors red, green, and blue, respectively. Each code image modulated by a subpixel corresponding to each of RGB may be expressed by Equation 6.

$$\begin{aligned} P_R(x,y)\vec{r} &= [S_R(x,y)\vec{r} + S_G(x,y)\vec{g} + S_B(x,y)\vec{b}] * A(x,y) \\ &= S_R(x,y) * A(x,y)\vec{r}, \\ P_G(x,y)\vec{g} &= [S_R(x,y)\vec{r} + S_G(x,y)\vec{g} + S_B(x,y)\vec{b}] * A(x,y) \\ &= S_G(x,y) * A(x,y)\vec{g}, \\ P_B(x,y)\vec{b} &= [S_R(x,y)\vec{r} + S_G(x,y)\vec{g} + S_B(x,y)\vec{b}] * A(x,y) \\ &= S_B(x,y) * A(x,y)\vec{b} \end{aligned}$$  [Equation 6]

Each color component C(x,y) may satisfy Equation 7 based on results obtained from Equation 6.

$$\begin{aligned} C_R(x,y) &= P_R(x,y) * D(x,y) = S_R(x,y) * D(x,y), \\ C_G(x,y) &= P_G(x,y) * D(x,y) = S_G(x,y) * D(x,y), \\ C_B(x,y) &= P_B(x,y) * D(x,y) = S_B(x,y) * D(x,y), \end{aligned}$$  [Equation 7]

In Equation 7, * denotes a convolution operation, and D(x,y) denotes a decoding pattern.

Accordingly, a color image R(x,y) regenerated with respect to the scene disposed on the front plane of the display may be expressed by Equation 8.

$$R(x,y) = C_R(x,y)\vec{r} + C_G(x,y)\vec{g} + C_B(x,y)\vec{b}.$$  [Equation 8]

Figure 10A:
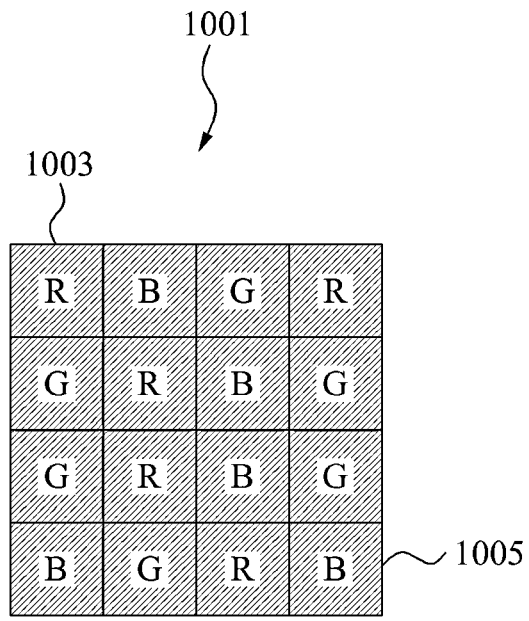
Figure 11:
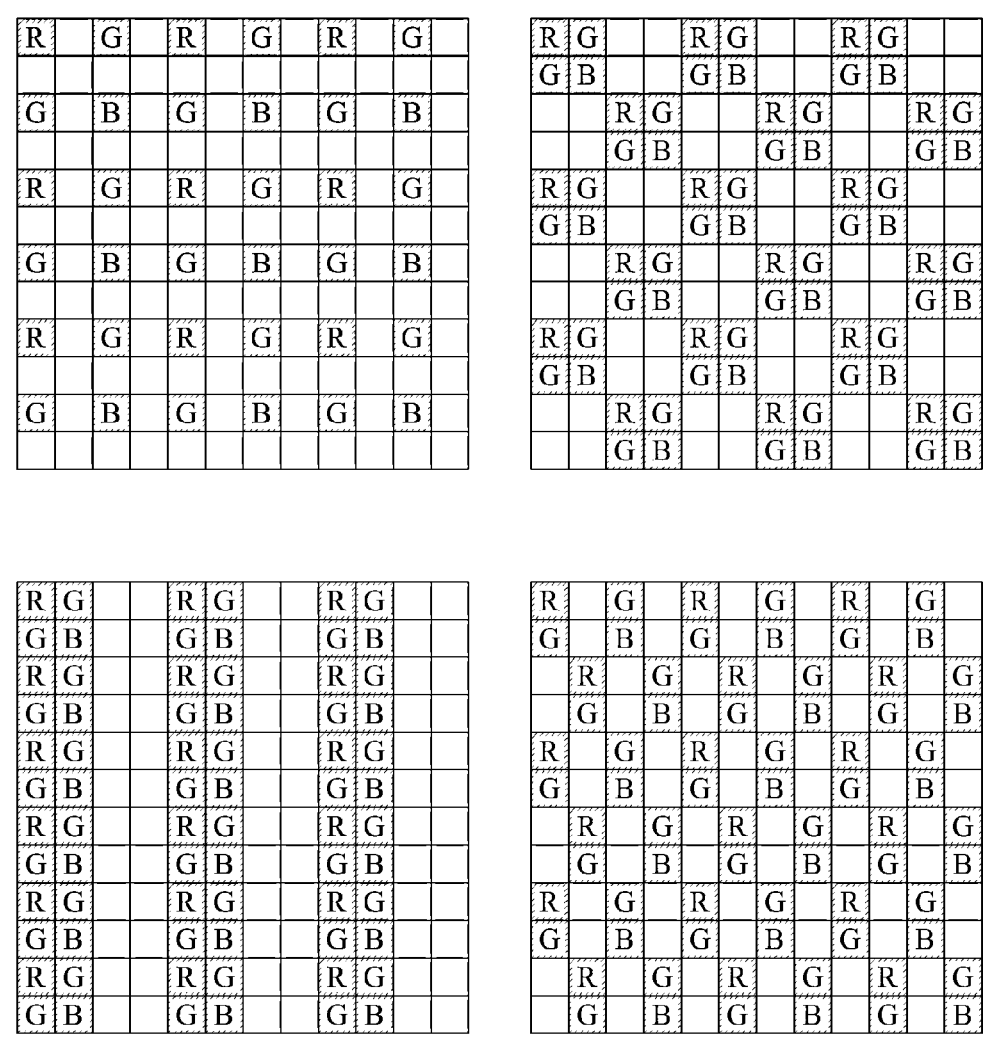

FIGS. 10A through 11 illustrate examples of colorizing a generated refocused image by applying color filters according to other example embodiments.

Figure 10B:
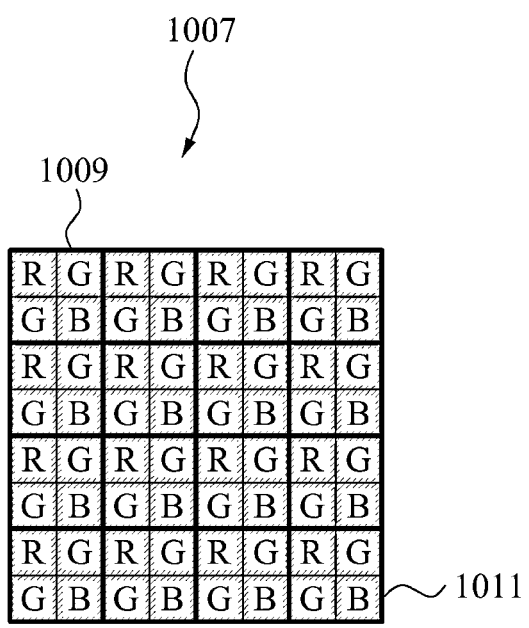

Referring to FIGS. 10A and 10B, a sensor panel may configure a sensor unit using color filters to acquire image data corresponding to colors of the color filters, by detecting lights that are input from an external object and pass through apertures formed on a display panel, respectively. In particular, the sensor panel may include a first pixel and a second pixel. Here, the first pixel and the second pixel may be configured using separate single color filters each corresponding to different colors, respectively, or may be configured to include a plurality of color filters each corresponding to different colors, respectively.

For example, a sensor panel 1001 may include a first pixel 1003 configured using a single color filter corresponding to red, and a second pixel 1005 configured using a single color filter corresponding to blue. A sensor panel 1007 may include a first pixel 1009 and a second pixel 1001 configured to include a plurality of color filters corresponding to red, blue, and green, respectively.

In addition, the sensor panel is not limited to the examples of FIGS. 10A and 10B. For example, the sensor panel may include color filters configured in various forms, as illustrated in FIG. 11.

Referring to FIG. 4, the display apparatus 401 may determine a refocused image in which the external object is in focus, among m refocused images, and may calculate the depth using the determined refocused image.

When the first refocused image 419 is determined as the refocused image in which the external object is in focus, among the plurality of refocused images, the display apparatus 401 may calculate the depth using the first refocused image 419.

For example, the display apparatus 401 may calculate a depth Z 429 from the external object 407 to the display panel 403, by using Eq 1 described above. For example, the display apparatus 401 may calculate a depth Z 429 from the external object 407 to the display panel 403 by dividing a resulting value, obtained by multiplying an aperture distance B 423 and a panel distance F 425, by a resulting value, obtained by subtracting the aperture distance B 423 from a point distance Δ 427. Here, the aperture distance B 423 may correspond to a distance between a first aperture 409-2 and a second aperture 409-3 that are formed in the display panel 403. The panel distance F 425 may correspond to a distance between the sensor panel 405 and the display panel 403. The point distance Δ 427 may correspond to a distance between the first point at which the image is captured in the first image acquiring area corresponding to the first aperture 409-2 and the second point at which the image is captured in the second image acquiring area corresponding to the second aperture 409-3.

Figure 5:
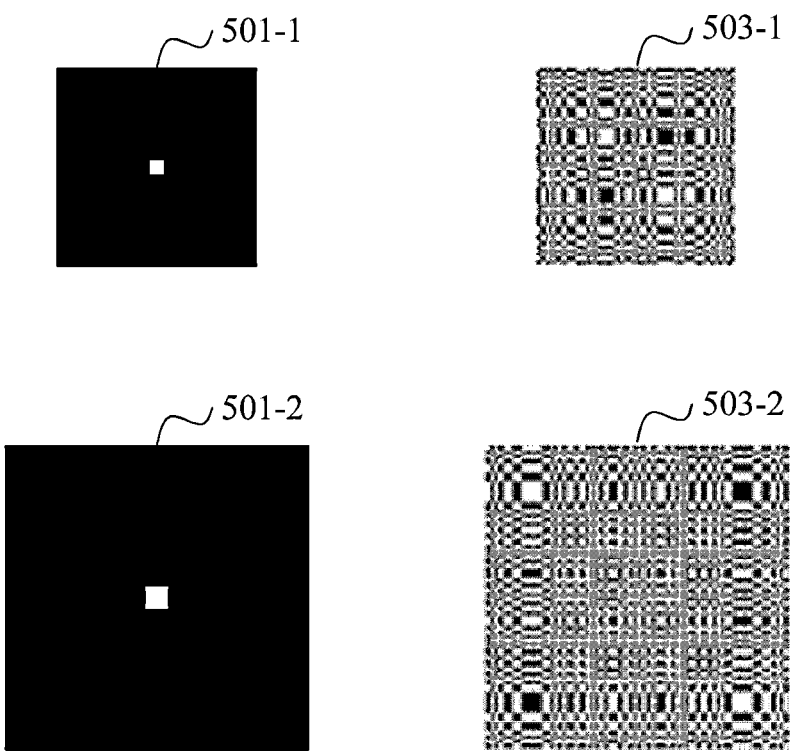
FIG. 5 illustrates imaging patterns formed on a display panel according to example embodiments.

FIG. 5 illustrates imaging patterns formed on a display panel according to example embodiments.

Referring to FIG. 5, the display panel may include one or more opaque pixels and one or more transparent pixels. The display panel may form hole patterns 501-1 and 501-2, for example, a circular hole pattern, and a polygonal hole pattern, and a coded aperture imaging (CAI) pattern having a plurality of apertures, by combining the one or more opaque pixels and the one or more transparent pixels. Here, the CAI pattern may correspond to, for example, an MURA pattern 503-1 or 503-2.

Also, the display panel may form patterns in various sizes. For example, the display panel may form the hole pattern 501-1 and the MURA pattern 503-1 corresponding to 67×67 pixels, or the hole pattern 501-2 and the MURA pattern 503-2 corresponding to 103×103 pixels.

Figure 6:
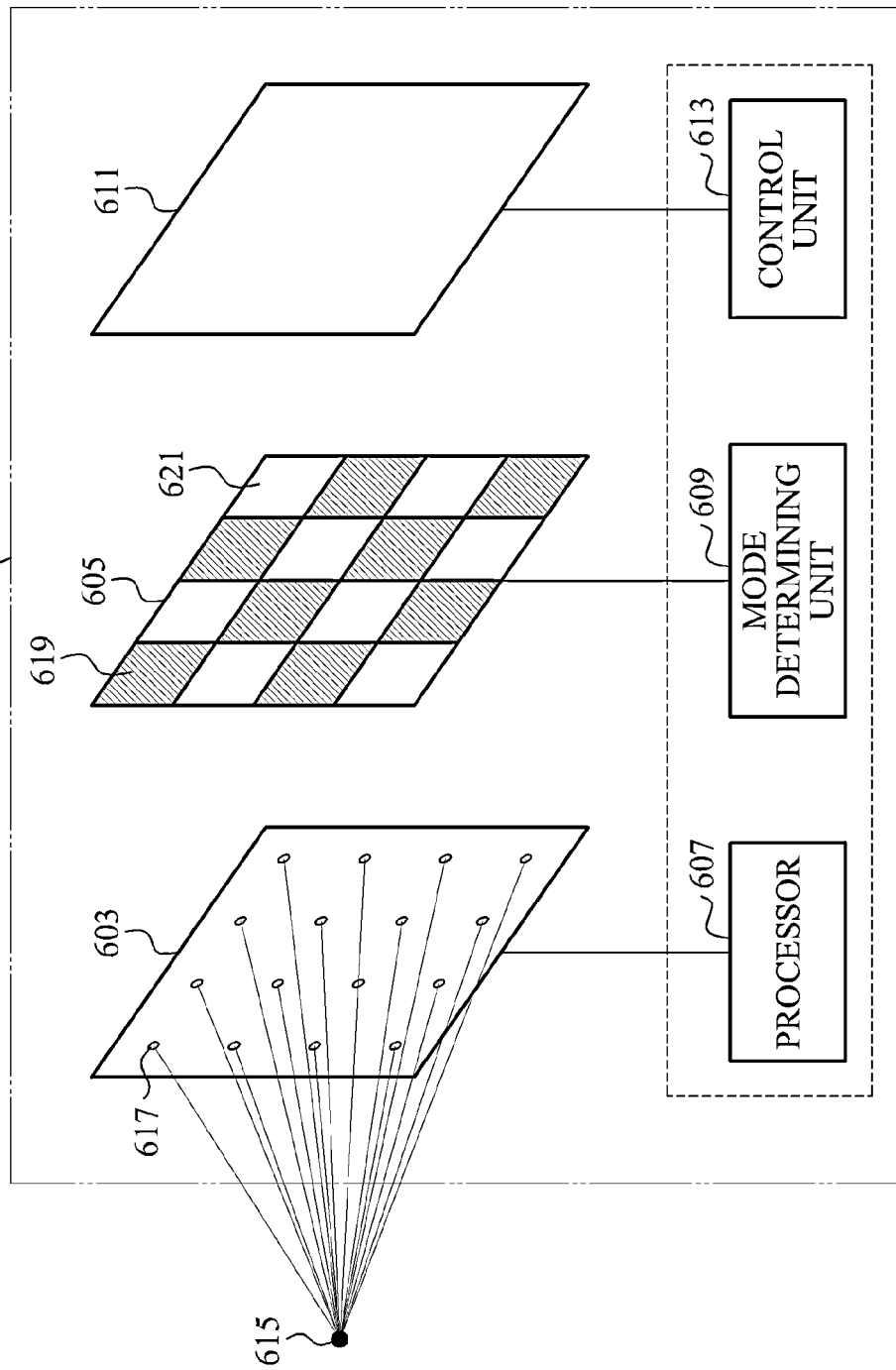
FIG. 6 illustrates a display apparatus for estimating a depth according to other example embodiments.

FIG. 6 illustrates a display apparatus 601 for estimating a depth according to other example embodiments.

Referring to FIG. 6, the display apparatus 601 may include a display panel 603, a sensor panel 605, and a processor 607. The display apparatus 601 may further include a mode determining unit 609, a backlight unit 611, and a control unit 613.

The display panel 603 may correspond to a liquid crystal display (LCD) panel, or an organic light emitting diode (OLED) panel. When the display panel 603 corresponds to an LCD panel, the display panel 603 may acquire an image for an external object 615 or display an image, depending on a 'photograph mode' or 'display mode' that may be determined by the mode determining unit 609.

The display panel 603 may include apertures 617 that may transmit lights input from the external object 615. That is, when a mode is determined to be the 'photograph mode' by the mode determining unit 609, the display panel 603 may form the apertures 617 as n imaging patterns, each including a plurality of pixels. Here, n may be a natural number. In particular, the display panel 603 may include an opaque pixel and a transparent pixel. The display panel 603 may form at least one of a circular hole pattern, a polygonal hole pattern, and an MURA pattern as an imaging pattern, by combining the opaque pixel and the transparent pixel.

When the mode is determined to be the 'display mode' by the mode determining unit 609, the display panel 603 may display an image using lights radiated from the backlight unit 611.

The sensor panel 605 may acquire a plurality of images by detecting lights that are input from the external object 615 and pass through the apertures 617 formed in the display panel 603. That is, the sensor panel 605 may acquire the plurality of images by detecting input lights passing through the n imaging patterns.

The sensor panel 605 may correspond to a sensor unit, and may include image acquiring areas 619 in which images may be acquired by detecting the input lights, and openings 621 which may transmit backlights. In this instance, the sensor panel 605 may configure the image acquiring areas 619 and the openings 621 in a checkered pattern or in a repetitive pattern.

Here, when the backlight unit 611 is disposed on a lower portion of the sensor panel 605, the openings 621 may transmit backlights radiated from the backlight unit 611 to the display panel 603. The openings 621 may refer to holes, in an optical meaning, that may transmit lights without blocking the lights, in the same manner of the apertures 617 of the display panel 603.

As other example embodiments, the sensor panel 605 may further include, in the openings 621, diffusers that may prevent the light from being concentrated in a part by diffusing the lights radiated from the backlight unit 611, or may dispose backlight units in the openings 621.

The processor 607 may generate a refocused image based on a disparity that may be set in association with the plurality of image acquiring areas 619 on the sensor panel 605, and may calculate a depth from the external object 615 to the display panel 603, using the refocused image. The disparity may be set to a difference value between a reference point at which the image is captured in a reference area, and a first point at which the image is captured in a remaining image acquiring area.

In particular, the processor 607 may generate m refocused images for each correlation, by shifting each image acquired in each of the plurality of image acquiring areas 619 based on the reference area in view of a corresponding disparity, and averaging the plurality of images shifted. Here, m may be a natural number.

The processor 607 may determine a refocusing image in which the external object 615 is in focus, among the m refocused images, and may calculate the depth using the determined refocused image. In this instance, the processor 607 may determine, among the m refocused images, a refocused image having a relatively high edge value or intensity value for the external object 615 to be the refocused image in which the external object 615 is in focus.

When the refocused image in which the external object 615 is in focus is determined, the processor 607 may calculate a depth from the external object 615 to the display panel 603, by dividing a resulting value, obtained by multiplying an aperture distance and a panel distance, by a resulting value, obtained by subtracting the aperture distance from a point distance. Here, the aperture distance may correspond to a distance between a first aperture and a second aperture adjacent to the first aperture formed on the display panel. The panel distance may correspond to a distance between the sensor panel and the display panel. The point distance may correspond to a distance between the first point at which the image is captured in a first image acquiring area corresponding to the first aperture, and the second point at which the image is captured in a second image acquiring area corresponding to the second aperture.

The mode determining unit 609 may determine a mode based on a set condition, for example, a 'display mode', or a 'photograph mode.' In this instance, the mode determining unit 609 may set, as the condition, at least one of an occurrence of mode change command, and an advent of mode change period. For example, when the display apparatus 601 is operated at a frequency of 240 hertz (Hz), the mode determining unit 609 may change the mode alternatively to the 'display mode' at 120 Hz, and to the 'photograph mode' at 120 Hz.

The backlight unit 611 may be disposed on a lower portion of the sensor panel 605. When the mode corresponds to the 'display mode,' the backlight unit 611 may radiate backlights to the display panel 603 disposed on an upper portion of the sensor panel 605 based on the control of the control unit 613. In this instance, the backlights may pass through the apertures 621 of the sensor panel 605 to be transferred to the display panel 603. Also, the backlight unit 611 may be disposed in the apertures 621 in the sensor panel 605 to radiate backlights to the display panel 603 disposed on the upper portion of the sensor panel 605.

The control unit 613 may control power supplied to the backlight unit 611 associated with an image panel, based on the mode determined by the mode determined unit 609. In particular, when the mode is determined to be the 'display mode' by the mode determining unit 609, the control unit 613 may control the backlight unit 611 to be turned ON. In this instance, in the 'display mode,' the backlight unit 611 may radiate backlights to the display panel 603 so that the display panel 603 may display an image by the backlights. When the mode is determined to be the 'photograph mode' by the mode determining unit 609, the control unit 613 may control the backlight unit 611 to be turned OFF.

The control unit 613 may change positions of the apertures 617 in the display panel 603 and the sensor panel 605 may acquire a plurality of images for each correlation when the control unit changes the positions of the apertures 617.

Figure 7:
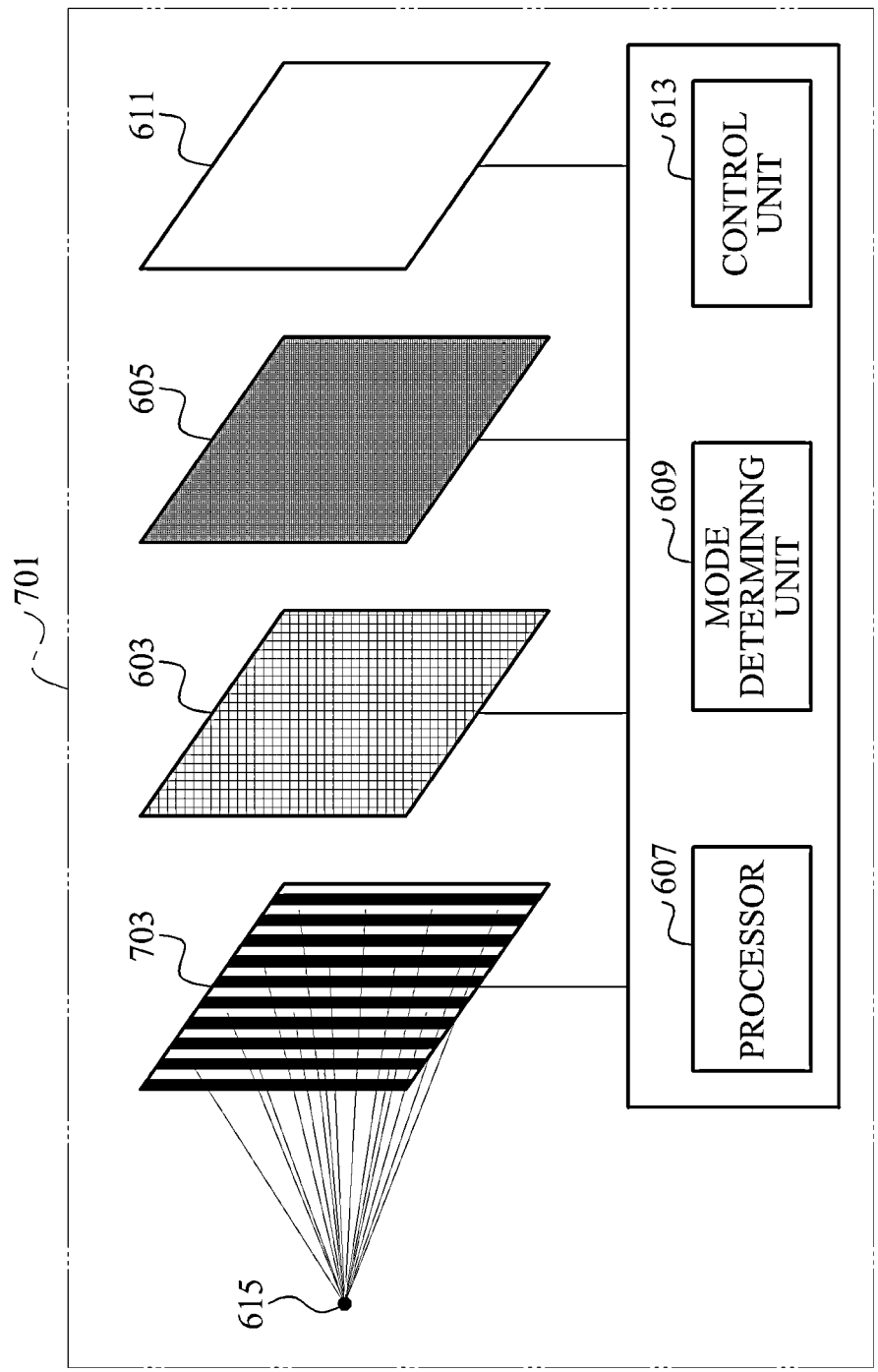
FIG. 7 illustrates a display apparatus for estimating a depth according to other example embodiments.

FIG. 7 illustrates a display apparatus 701 for estimating a depth according to other example embodiments.

Referring to FIG. 7, the display unit 701 may have a configuration of the display apparatus 601 of FIG. 6 further including a barrier panel 703. Since a basic configuration of the display apparatus 701 is identical to the configuration of the display apparatus 601 described with reference to FIG. 6, duplicated descriptions will be omitted for conciseness.

The barrier panel 703 may form a pattern based on a mode determined by a mode determining unit 609. For example, when the mode is determined to be a 'photograph mode' by the mode determining unit 609, the barrier panel 703 may form apertures that may transmit lights input from an external object 615. In particular, the barrier panel 703 may include one or more opaque pixels and one or more transparent pixels. The barrier panel 703 may form the apertures by forming at least one of a circular hole pattern, a polygonal hole pattern, and an MURA pattern, by combining the one or more opaque pixels and the one or more transparent pixels.

Conversely, when the mode is determined to be a 'display mode' by the mode determining unit 609, the barrier panel 703 may form a barrier pattern for visualizing an image to be displayed on a display panel 603 as a three-dimensional (3D) image so that different images may be recognized based on a binocular disparity between left and right viewpoints. Here, the barrier panel 703 may form, for example, a striped pattern as the barrier pattern.

The display panel 603 may be disposed on a lower portion of the barrier panel 703. When the mode is determined to be the 'photograph mode' by the mode determining unit 609, the display panel 603 may transparentize pixels on the display panel 603, and may transfer, to a sensor panel 605, input lights passing through the apertures in the barrier panel 703.

Conversely, when the mode is determined to be the 'display mode' by the mode determining unit 609, the display panel 603 may display an image using lights radiated from a backlight unit 611.

Also, the display panel 603 may include a sensor unit that may replace the sensor panel 605. In this instance, the sensor panel 605 may be unnecessary and thus, provision of a 3D image may be supported and a thickness of the display apparatus 701 may be reduced, simultaneously.

Figure 8:
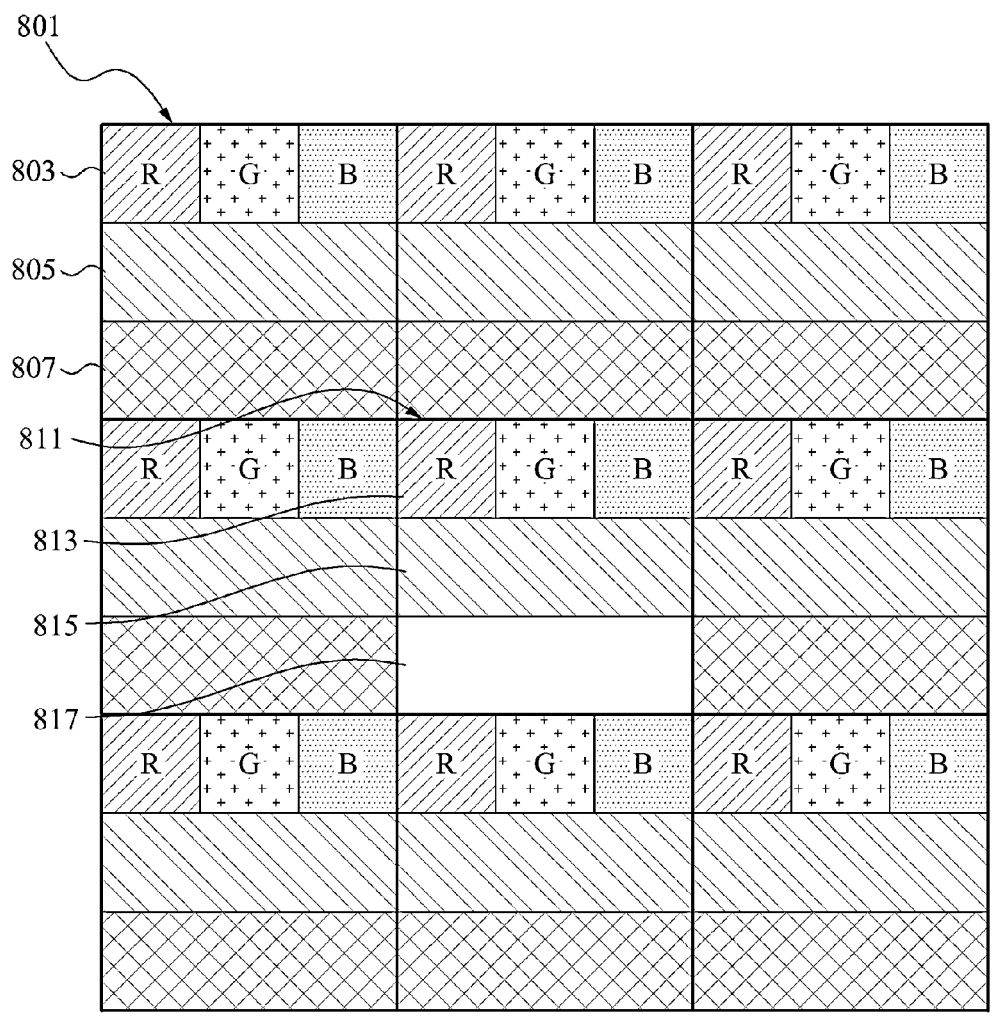
FIG. 8 illustrates a display panel in a display apparatus for estimating a depth according to example embodiments.

FIG. 8 illustrates a display panel in a display apparatus for estimating a depth according to example embodiments.

Referring to FIG. 8, the display apparatus may include, for example, an OLED panel as a display panel. That is, the display apparatus may use a display panel including a plurality of OLED pixels. In this instance, the display panel may form an imaging pattern using the plurality of OLED pixels, and may transmit lights input from an external object through the imaging pattern, thereby transferring the input lights to a sensor panel.

The display apparatus may transmit the input lights passing through the imaging pattern, photograph or detect the external object, and emit lights independently to display an image without a separate backlight means, using the display panel including the plurality of OLED pixels.

The OLED pixels may include a light emitting unit to emit at least one of red light, green light, and blue light, using a light-emitting organic compound, a circuit unit to operate the light emitting unit, and a window, for example, a glass substrate, to transmit or block lights input from an external environment. Here, when the window is formed to be transparent, the window may transmit the lights input from the external environment. When the window is formed to be opaque, the window may block the input lights.

For example, a first OLED pixel 801 may include a light emitting unit 803 to display an image to be broadcasted by emitting lights, a circuit unit 805 to operate the light emitting unit 803, and an opaque window 807 to block lights input from an external environment. Also, a second OLED pixel 811 may be configured in a similar manner in which the first OLED pixel 801 may be configured. However, the second OLED pixel 811 may include a transparent window 817 that may transmit the lights input from the external environment. That is, the second OLED pixel 811 may include a light emitting unit 813, a circuit unit 815, and the transparent window 817.

Figure 9:
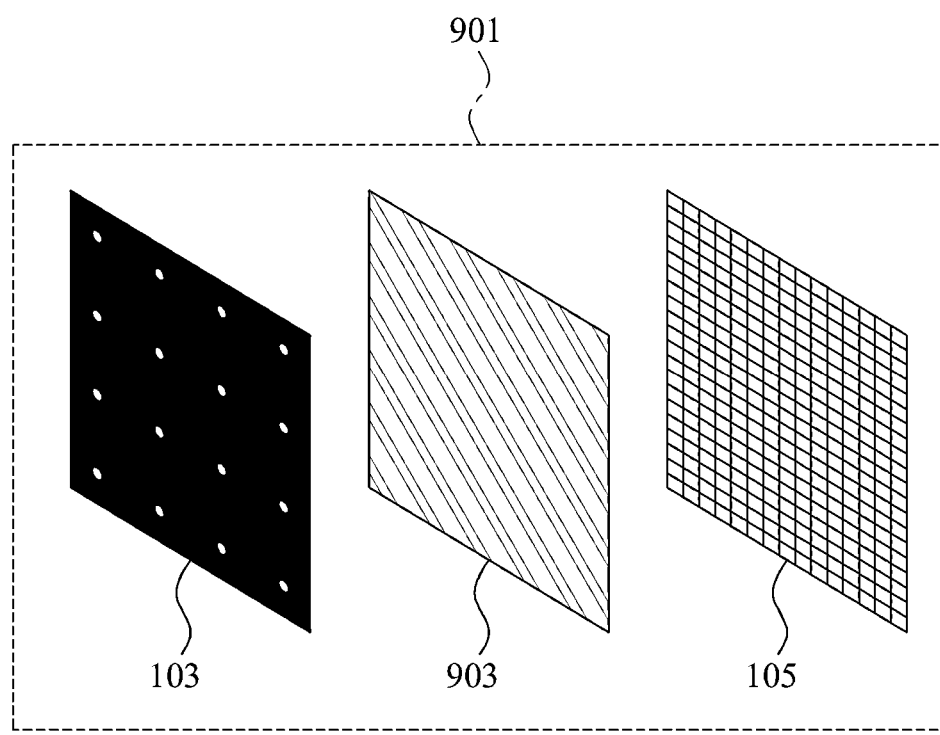
FIG. 9 illustrates a display apparatus for estimating a depth according to other example embodiments.

FIG. 9 illustrates a display apparatus 901 for estimating a depth according to yet other example embodiments.

Referring to FIG. 9, the display apparatus 901 may have a configuration of the display apparatus 101 of FIG. 1 further including a pass filter 903.

Here, a display panel 103 may include an imaging pattern formed using a plurality of OLED pixels, and may transmit, through the imaging pattern, lights, for example, sunlight, that are input from an external object.

Also, the display panel 103 may further include an infrared (IR) light source in the plurality of OLED pixels. In this instance, IR lights output from the IR light source may be returned by an external object, and may be input into the display panel 103 as input lights. The display panel 103 may transfer, through the imaging pattern, the input lights to the pass filter 903 disposed in a rear end of the display panel 103. Thus, the display apparatus 901 may detect a much greater number of infrared components from the input lights, thereby acquiring a clearer image for the external object.

The pass filter 903 may be disposed between the display panel 103 and a sensor panel 105 to extract infrared components from the input lights passing through the imaging pattern of the display panel 103. In this instance, the sensor panel 105 disposed on a rear end of the pass filter 903 may generate image data for the external object by detecting only the extracted infrared components, aside from other rays, for example, ultraviolet rays and/or visible rays included in the input lights, thereby reducing noise in the image.

Also, the pass filter 903 may be formed to be included or integrated in the plurality of OLED pixels on the display panel 103. For example, the pass filter may be formed to be included or integrated in the plurality of OLED pixels by using one or more windows.

FIG. 12 illustrates a method of estimating a depth of an external object to a display panel of a display apparatus, according to the above described example embodiments.

Operation 1210 may correspond to acquiring a plurality of images in a plurality of image acquiring areas by detecting light input from an external object to the display apparatus. The input light may pass through apertures formed in a display panel and the light transmitted from the display panel may be acquired by a sensor panel, for example.

Operation 1220 may correspond to calculating a difference value between a coordinate value of a first point at which an image is captured and a coordinate value of a second point at which the image is captured in an adjacent image acquiring area.

Operation 1230 may correspond to generating one or more refocused images based on a disparity that is set in association with the plurality of image acquiring areas on the sensor panel.

Operation 1240 may correspond to calculating a depth value from the external object to the display panel, using a refocused image from among the one or more refocused images. A refocused image having a relatively high edge value or intensity value for the external object may be selected as the refocused image in which the external object is determined to be in focus, and a depth value may be calculated therefrom.

Thus, a display apparatus and method according to the above-disclosed embodiments may calculate a depth distance of an external object to the display panel when light is emitted from the external object to the display panel. The display panel may have one or more apertures in which light is transmitted through to a sensor panel. The sensor panel may be composed of one or more image acquiring areas in which images may be acquired, and one or more refocused images may be obtained based on a disparity that is set in association with the plurality of image acquiring areas. A refocused image having a relatively higher edge or intensity value may be used to calculate the depth value. The display apparatus may further include a backlight unit or barrier panel or pass filter in various embodiments.

The display apparatus and method according to the above-described example embodiments may use one or more processors, which may include a microprocessor, central processing unit (CPU), digital signal processor (DSP), or application-specific integrated circuit (ASIC), as well as portions or combinations of these and other processing devices.

The terms "module", and "unit," as used herein, may refer to, but is not limited to, a software or hardware component, circuit, or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The display method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Although example embodiments have been shown and described, it would be appreciated by those skilled in the art that changes may be made in these embodiments without departing from the principles and spirit of the disclosure, the scope of which is defined by the claims and their equivalents.

What is claimed is:

1. A display apparatus to estimate a depth, the apparatus comprising:
 a display panel comprising a plurality of apertures configured to receive and transmit light input from an object;
 a pass filter configured to extract infrared components from light passing through the plurality of apertures;
 a sensor panel configured to generate image data of the object by detecting the extracted infrared components; and
 a processor configured to generate a refocused image, based on a disparity associated with a plurality of image acquiring areas on the sensor panel, and configured to calculate a depth from the object to the display panel, by using the refocused image.

2. The apparatus of claim 1, wherein each of the plurality of image acquiring areas maintains a constant correlation between: a first point at which the image is captured, and a second point at which the image is captured in an adjacent image acquiring area.

3. The apparatus of claim 2, wherein
 the plurality of image acquiring areas comprises a plurality of points, each having a coordinate value, and
 the correlation is maintained constant, when a difference between a coordinate value of the first point and a coordinate value of the second point is identical, in each of the plurality of image acquiring areas.

4. The apparatus of claim 2, wherein
 the disparity is set as a difference value between: a reference point at which the image is captured in a reference area, and the first point at which the image is captured in a remaining image acquiring area, among the plurality of image acquiring areas, and
 the processor is configured to generate "m" refocused images for each correlation, by shifting each image acquired in each of the plurality of image acquiring areas, based on the reference area in view of a corresponding disparity, and by averaging the plurality of images shifted,
 wherein "m" is a natural number.

5. The apparatus of claim 4, wherein the processor is configured to determine a refocused image in which the object is in focus, among the "m" refocused images, and is configured to calculate the depth, by using the determined refocused image.

6. The apparatus of claim 5, wherein, when the refocused image in which the object is in focus is determined, the processor is configured to calculate the depth by dividing a resulting value, obtained by multiplying an aperture distance and a panel distance, by a resulting value, obtained by subtracting the aperture distance from a point distance,
 the aperture distance corresponding to a distance between: a first aperture, and a second aperture adjacent to the first aperture formed on the display panel,
 the panel distance corresponding to a distance between the sensor panel and the display panel, and
 the point distance corresponding to a distance between: the first point at which the image is captured in a first image acquiring area corresponding to the first aperture, and the second point at which the image is captured in a second image acquiring area corresponding to the second aperture.

7. The apparatus of claim 4, wherein the processor is configured to determine a refocused image having a relatively higher edge value or intensity value for the object, among the "m" refocused images, and is configured to calculate the depth, by using the determined refocused image.

8. The apparatus of claim 1, wherein
 the display panel is configured to form the apertures as "n" imaging patterns, each comprising a plurality of pixels, and
 the sensor panel is configured to acquire the plurality of images, by detecting the input lights passing through the "n" imaging patterns,
 wherein "n" is a natural number.

9. The apparatus of claim 8, wherein
 the display panel comprises one or more opaque pixels and one or more transparent pixels, and
 the display panel is configured to form, as an imaging pattern, at least one of a circular hole pattern, a polygonal hole pattern, and a Modified Uniformly Redundant Array (MURA) pattern, by combining the one or more opaque pixels and the one or more transparent pixels.

10. The apparatus of claim 1, wherein
the sensor panel comprises a first pixel and a second pixel, configured by using separate single color filters each corresponding to different colors, respectively, or configured to include a plurality of color filters each corresponding to different colors, respectively, and
the sensor panel is configured to acquire an image corresponding to the colors of the plurality of color filters, by detecting the input light.

11. A display apparatus configured to estimate a depth, the apparatus comprising:
a display panel configured to receive light input from an object, and configured to form a plurality of imaging patterns using one or more pixels;
a pass filter configured to extract infrared components from light passing through the plurality of apertures;
a sensor panel configured to generate image data of the object by detecting the extracted infrared components; and
a processor configured to generate at least one refocused image, based on a disparity associated with a plurality of image acquiring areas on the sensor panel, and configured to calculate a depth from the object to the display panel, by using a refocused image from among the generated at least one refocused images.

12. The apparatus of claim 11, wherein the display panel comprises one of a liquid crystal display (LCD) or an organic light emitting diode (OLED) panel.

13. The apparatus of claim 11, further comprising:
a mode determining unit configured to determine whether to operate the display panel in a photograph mode or display mode;
a backlight unit disposed on a lower portion of the sensor panel configured to radiate backlight to the display panel according to the determined mode; and
a control unit to control power provided to the backlight unit, according to the determined mode.

14. The apparatus of claim 11, further comprising:
a mode determining unit configured to determine whether to operate the display panel in a photograph mode or display mode;
a barrier panel configured to form a pattern according to the determined mode; and
a control unit configured to control power to the barrier panel according to the determined mode,
wherein the display panel is disposed on a lower portion of the barrier panel.

15. The apparatus of claim 14, wherein the barrier panel includes one or more opaque pixels and one or more transparent pixels, and
when the mode is determined as a photograph mode by the mode determining unit, the barrier panel is configured to form apertures to transmit light input from the object, by forming at least one of a circular hole pattern, a polygonal hole pattern, and a Modified Uniformly Redundant Array (MURA) pattern, by combining the one or more opaque pixel and one or more transparent pixels.

16. The apparatus of claim 15, wherein when the mode is determined as a display mode by the mode determining unit, the barrier panel is configured to form a barrier pattern to visualize an image displayed on the display panel as a three-dimensional image by forming a striped pattern.

17. The apparatus of claim 11, wherein the display panel includes a plurality of organic light emitting diode (OLED) pixels configured to form an imaging pattern, the OLED pixels comprising:
a light emitting unit configured to emit light using a light-emitting organic compound;
a circuit unit configured to operate the light emitting unit; and
a window configured to transmit or block light input from an environment.

18. The apparatus of claim 17,
wherein one or more of the OLED pixels further comprise an infrared light source configured to output infrared light which is reflected by the object back to the display panel, and
wherein the pass filter is configured to extract infrared components of light transmitted by the display panel, including infrared light reflected from the object back to the display panel, and
wherein the sensor panel is configured to generate image data for the object, by detecting the extracted infrared components.

19. The apparatus of claim 11, wherein
the sensor panel comprises a first pixel and a second pixel configured using separate single color filters each corresponding to different colors, respectively, or configured to include a plurality of color filters each corresponding to different colors, respectively, and
the sensor panel is configured to acquire an image corresponding to the colors of the plurality of color filters, by detecting the input light.

20. The apparatus of claim 11,
wherein the pass filter is configured to extract infrared components of light transmitted by the display panel, including infrared light reflected from the object back to the display panel.

21. A display method of estimating a depth, the method comprising:
acquiring a plurality of images in a plurality of image acquiring areas, by detecting lights emitted from an object and transmitted through: a plurality of apertures of a display panel, and through a pass filter;
generating refocused images based on a disparity associated with the plurality of image acquiring areas; and
calculating a depth from the object to the display panel, by using at least one of the refocused images.

22. The display method of claim 21, wherein the acquiring a plurality of images in a plurality of image acquiring areas further comprises:
capturing an image in a first image acquiring area;
capturing an image in a second image acquiring area; and
acquiring a correlation between: a first point at which the image is acquired in the first image acquiring area, and a second point at which the image is acquired in the second image acquiring area,
and the generating one or more refocused images further comprises:
generating one or more refocused images, by shifting each of the plurality of image acquiring areas based on a reference area in view of a corresponding set disparity; and
averaging the plurality of images shifted.

23. The display method of claim 22, wherein the generating one or more refocused images further comprises:
setting the disparity, by calculating a difference value between: a reference point at which the image is acquired in the reference area, and a first point at which the image is acquired in a remaining image acquiring area.

24. The display method of claim 21, further comprising:
determining a refocused image from among the one or more refocused images in which the object is in focus, and
calculating the depth from the object to the display panel, by using the determined refocused image in which the object is in focus.

25. The display method of claim 21,
wherein the pass filter is configured to extract infrared components of light transmitted by the display panel, including infrared light reflected from the object back to the display panel.

\* \* \* \* \*